United States Patent
Mueller et al.

(10) Patent No.: US 7,894,602 B2
(45) Date of Patent: Feb. 22, 2011

(54) SYSTEM AND METHOD FOR GENERATING PSEUDO-RANDOM NUMBERS

(75) Inventors: Maik Mueller, St. Leon-Rot (DE); Michael Freidrich, Mannheim (DE); Klaus Kiefer, Heidelberg (DE); Ralf Miko, Wailduern (DE); Juergen Schneider, Ludwigshafen (DE)

(73) Assignee: SAP AG, Walldorf (DE)

( * ) Notice: Subject to any disclaimer, the term of this patent is extended or adjusted under 35 U.S.C. 154(b) by 762 days.

(21) Appl. No.: 11/394,762

(22) Filed: Mar. 31, 2006

(65) Prior Publication Data

US 2007/0230693 A1 Oct. 4, 2007

(51) Int. Cl.
*H04L 9/00* (2006.01)

(52) U.S. Cl. .................... 380/46; 380/44; 380/262; 380/263; 708/250; 708/254

(58) Field of Classification Search ......... 380/276–278, 380/284, 286, 46; 713/182–185, 176; 726/28, 726/30, 33; 714/22–30
See application file for complete search history.

(56) References Cited

U.S. PATENT DOCUMENTS

| 5,627,894 | A | | 5/1997 | Albert et al. | |
|---|---|---|---|---|---|
| 5,778,069 | A | * | 7/1998 | Thomlinson et al. | 380/262 |
| 6,076,097 | A | * | 6/2000 | London et al. | 708/250 |
| 6,628,786 | B1 | * | 9/2003 | Dole | 380/44 |
| 2004/0162864 | A1 | * | 8/2004 | Nowshadi et al. | 708/254 |
| 2005/0208891 | A1 | * | 9/2005 | Khare et al. | 455/39 |

FOREIGN PATENT DOCUMENTS

| EP | 1 840 731 A2 | 10/2007 |
|---|---|---|
| JP | 2000-242470 | 9/2000 |

OTHER PUBLICATIONS

Extended European Search Report dated Nov. 2, 2007, in counterpart European Application No. 07004449.0.
EPO communication pursuant to Article 94(3) EPC, for Application No. 07 004 449.0-1229, mailed Nov. 16, 2009 (7 pages).
Kelsey J. et al: "Yarrow-160: Notes on the Design and Analysis of the Yarrow Cryptographic Pseudorandom Number Generator" Selected Areas in Cryptography SAC '99. LNCS 1758., Aug. 1999, pp. 13-33, XP001 012490 Springer-Verlag, Berlin, Germany.

(Continued)

*Primary Examiner*—Taghi T Arani
*Assistant Examiner*—Gregory Lane
(74) *Attorney, Agent, or Firm*—Finnegan, Henderson, Farabow, Garrett & Dunner, LLP.

(57) ABSTRACT

A process and system for generating a pseudo-random number is presented. Input data having entropy is gathered in an Entropy Pool and transformed once by a cryptographic hash function. The transformed data forms the internal state of the pseudo-random number generator. The generator forms the output by applying a second cryptographic hash function to this internal state. Finally, the generator updates the internal state by inputting the current internal state and data from the Entropy Pool into a third cryptographic hash function. The output of the third hash function forms the new internal state of the pseudo-random number generator.

17 Claims, 7 Drawing Sheets

OTHER PUBLICATIONS

Anonymous: "Randomness From the High Performance Frequency Counter?" Apr. 16, 2004, XP00791 0421, Retrieved from the Internet: URL:http://web.archive.org/web/200603241 01731/www.citadelsoftware.calhptimer/hptimer.htm [retrieved on Nov. 3, 2009] (3 pages).

"Chapter 10; Generating Randomness" In: N. Ferguson et al.: "Practical Cryptography" 2003, Wiley Publishing, Inc., Indianapolis, Indiana, USA, XP007910422 ISBN: 047122894X , pp. 155-184.

Schneier B: "Applied Cryptography, Protocols, Algorithms, and Source Code in C" 1996, John Wiley & Sons, Inc, New York, NY, USA, XP002909770 ISBN: 978-0-471-11709-4 , pp. 423-426.

Menezes A et al: "Handbook of Applied Cryptography, pseudorandom bits and sequences" Handbook of Applied Cryptography; [CRC Press Series on Discrete Mathematices and Its Applications], CRC Press, Boca Raton, FL, USA, 1997, pp. 172-173, XP002178884 ISBN: 978-0-8493-8523-0.

* cited by examiner

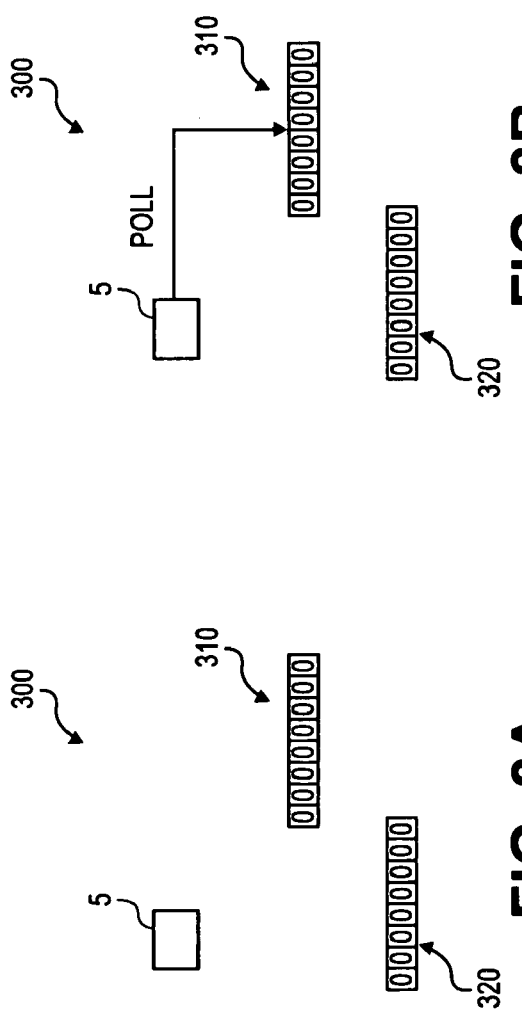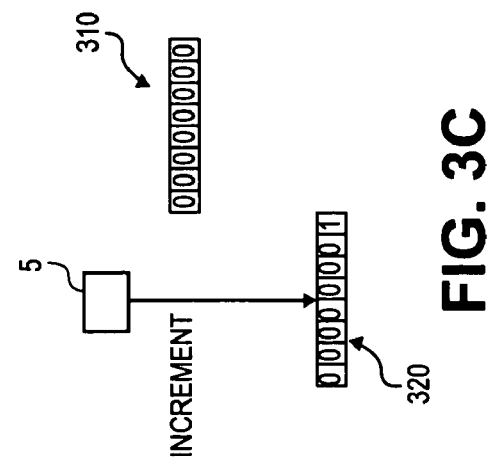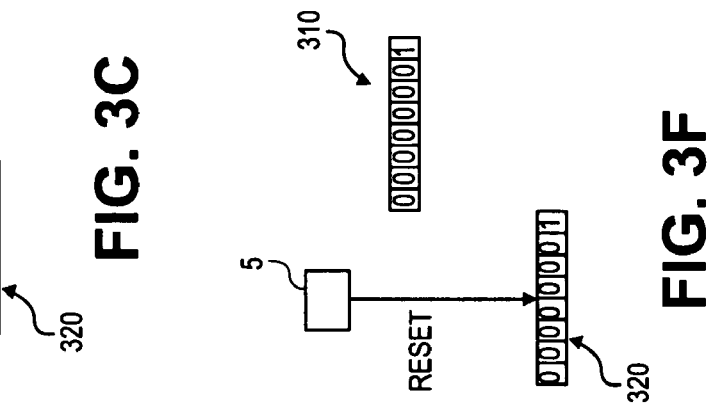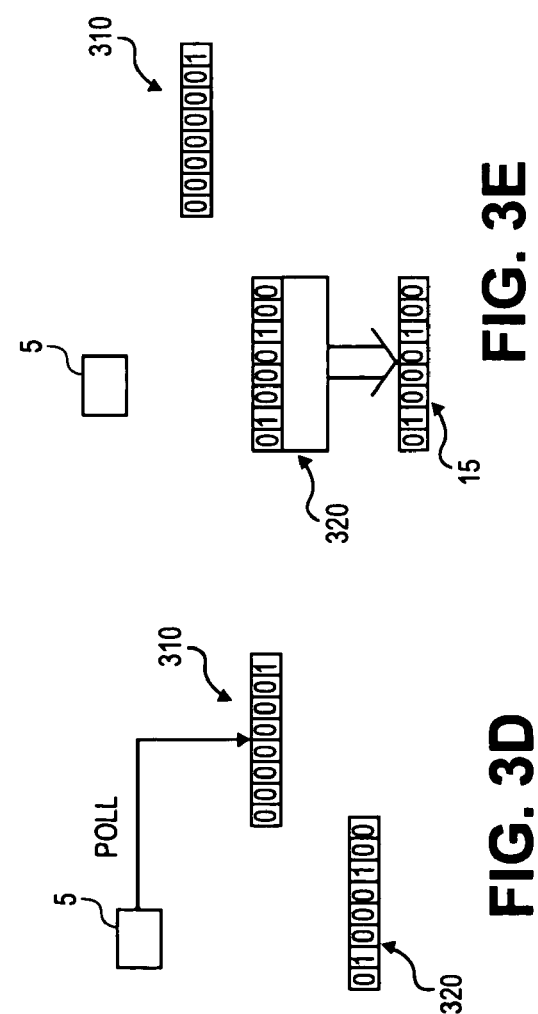

SYSTEM AND METHOD FOR GENERATING PSEUDO-RANDOM NUMBERS

DESCRIPTION OF THE INVENTION

1. Field of the Invention

This invention relates to computer-implemented methods and systems for generating pseudo-random numbers.

2. Background of the Invention

Modern cryptography relies on cryptographic keys to protect data confidentiality, ensure data integrity, and guarantee data authenticity. The security offered by a cryptographic key, which is a bit string of a certain length, depends on the cryptographic algorithm; the randomness, or entropy, of the cryptographic key; and the secrecy with which the cryptographic key is held. Generally speaking, cryptographic applications are more secure if no part or value of the cryptographic key can be predicted. Therefore, many cryptographic applications use pseudo-random number generators ("PRNGs") to generate cryptographic key information.

Currently, however, in common server or computer environments, generating sufficiently random data to serve as the cryptographic key cannot be guaranteed because of the different platforms and usage conditions that exist. For instance, some environments cannot rely on manual assistance by a human user or operator to generate random data containing entropy. As a result, the security provided by a PRNG may be compromised because of the inability to find a general source of random data, not observable to or predictable by a potential attacker, from which to obtain the random inputs for the generator. Furthermore, because collecting sufficient random input takes time, capturing this random input must occur only at initialization or else the overall performance of the system or application may suffer.

SUMMARY OF THE INVENTION

In accordance with the invention, an improved method and system are presented for generating pseudo-random numbers. The system for generating a pseudo-random number consists of an entropy value collector that collects entropy values; a first data memory for storing the collected entropy values; a second data memory for storing an internal state for the system; and finally, a processor that transforms some of the collected entropy values stored in the first data memory to form the internal state, generates a pseudo-random by applying a hash function, and updates the internal state using the current value of the internal state and collected entropy values from the entropy value collector.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

BRIEF DESCRIPTION OF THE DRAWINGS

FIGS. 3A-F show a timer for use in a pseudo-random number generator consistent with the present invention.

DESCRIPTION OF THE EMBODIMENTS

Reference will now be made in detail to the present embodiments of the invention, examples of which are illustrated in the accompanying drawings. Wherever possible, the same reference numbers will be used throughout the drawings to refer to the same or like parts.

Figure 1:
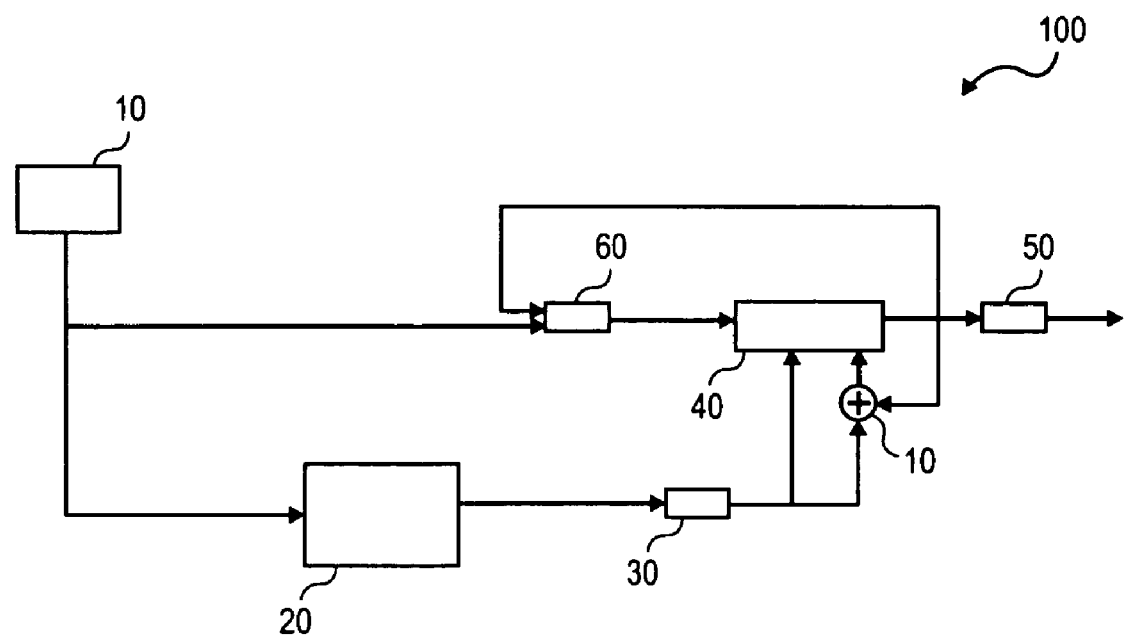
FIG. 1 shows a block diagram of the pseudo-random number generator.

FIG. 1 shows a block diagram of PRNG function 100. As shown in FIG. 1, PNRG function 100 comprises an entropy value collector 10; an entropy pool 20; a hash algorithm 30; a Random Pool 40; an output hash algorithm 50; an update hash algorithm 60; and an XOR function 70.

The actions of the different components of PRNG function 100 are controlled by a processor (not shown). In some embodiments, the processor can be a central processing unit on a general or specific purpose computer. In some embodiments, the controlling processor can be an application specific integrated circuit. When another program, module, or function needs a pseudo-random number ("PRN"), the processor will run PRNG function 100. PRNG function 100 will then use the other components to produce a PRN for the calling program, module, or function.

Figure 2:
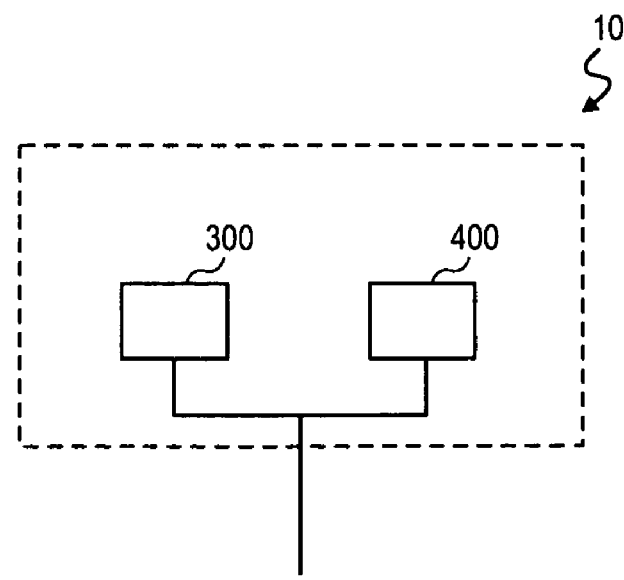
FIG. 2 shows initialization of a Random Pool of a pseudo-random number generator (PNRG) consistent with the present invention.

Entropy value collector 10 provides data that contains entropy. In some embodiments, such as the one shown in FIG. 2, entropy value collector 10 includes at least one of a timer model 300 and a high performance counter ("HPC") 400. In some embodiments, an example of which is shown in FIGS. 3A-F, timer model 300 includes processor 5, system timer 310, and program counter 320. In operation, system timer 310 increments at a slower rate than the rate at which processor 5 can poll system timer 310. As shown in FIG. 3B, processor 5 continuously polls the value of system timer 310. During each polling by processor 5 in which system timer 310 remains the same, processor 5 increments program counter 320, as shown in FIG. 3C. Thus, the value of program counter 320 also increments at a rate much faster than the rate at which system timer 310 increments. When processor 5 detects a change in system timer 310, an example of which is shown in FIG. 3D, it will save the value of program counter 320 as an entropy value 15, an example of which is shown in FIG. 3E. Processor 5 will then reset the value of program counter 320, as in FIG. 3F.

Entropy is created in timer model 300 in at least two different ways. First, because the rate at which processor 5 can poll system timer 310 depends on the task scheduling of and load on processor 5, the corresponding rate at which processor 5 increments program counter 320 will depend on the task scheduling of and load on processor 5. This dependency will create entropy in program counter 320. Second, system timer 310 increments at a much slower pace, and will be less accurate, than program counter 320. Due to the lower accuracy of system timer 310, the captured value of program counter 320 cannot be determined from any previously captured value, and program counter 320 will contain entropy.

In some embodiments, processor 5 timer may be implemented using the processor that controls PRNG function 100. In some embodiments, processor 5 may be a different processor than the processor controlling PRNG function 100. In some embodiments, model 300 may be implemented using software code. For instance, system timer 310 can be implemented using the C-programming function clock ( ). In some embodiments, this function increments about once every 10 ms. In some embodiments, the rate at which the clock ( ) function increments is a function of the load on the central processing unit used to implement the clock ( ) function. Processor 5 will poll system timer 310 and increment program counter 320 at a much higher rate than the rate at which system timer 310 increments. In some embodiments, processor 5 polls system timer 310 several hundred times before system timer 310 increments. Moreover, in some embodiments, program counter 320 is represented by a variable in a programming language, such as in C. Processor 5 increments this variable each time it polls system timer 310 and system timer 310 remains unchanged. Processor 5 captures the value of the variable as an entropy value 15 when the value of system timer 310 changes. Processor 5 then resets the value of the variable used as program counter 320.

Figure 4C:
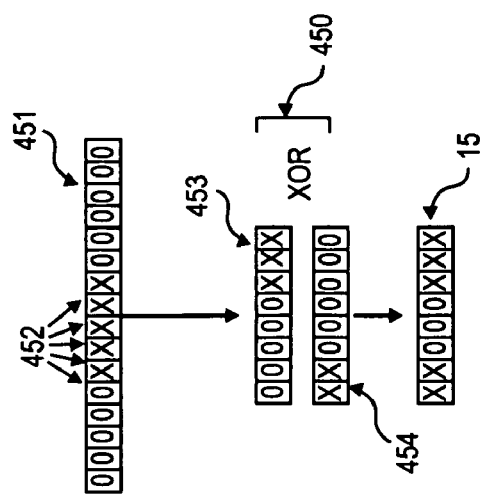
FIGS. 4A-C show a High Performance Counter (HPC) consistent with the present invention.
Figure 4B:
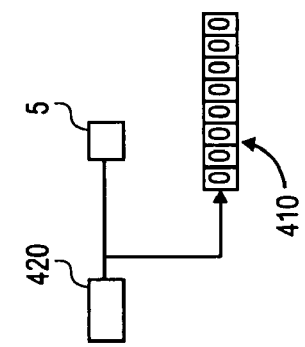
Figure 4A:
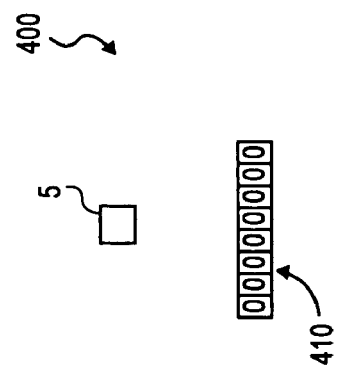

An example HPC 400 is shown in FIG. 4A, including a processor 5 and platform counter 410. In some embodiments, clock 420 controls both the timing for processor 5 and the rate at which platform counter 410 increments, as shown in an. example in FIG. 4B. In other embodiments, different clocks will control processor 5 and platform counter 410.

The rate at which processor 5 captures the value of platform counter 410 and uses it as an entropy value 15 will be a function of different events. In some embodiments, processor 5 will capture the value of platform counter 410 when system timer 310 of timer model 300 changes values. In some embodiments, platform counter 410 increments once every microsecond. In some embodiments, platform counter 410 increments once every nanosecond. Because platform counter 410 increments at a much faster rate and has much higher accuracy than system timer 310, the value captured from platform counter 410 contains entropy. Other events may also determine when processor 5 captures the value of platform counter 410 as an entropy value 15. In some embodiments, processor 5 will capture the value the value of platform counter 410 when a user, function, process, etc. requests a random number. Because the rate at which a random number will be requested by the calling person, function, process, etc. is random, the corresponding value captured from platform counter 410 will also be random.

Examples of computer hardware that can be used to implement a computer platform consistent with the present invention include the AMD-X86, the Intel-IA64, the Sparc processor, the POWERPC, the Intel-X86, and other x64 common 64-bit central processing unit architectures by Advanced Micro Devices, Inc., and Intel Corporation. Examples of an operating system that the platform can use to operate the hardware include WINDOWSXP, HP-UX, SunOS, SUN MICROSYSTEMS SOLARIS, AIX, OS400, OS390, and LINUX. HPCs composed of a different type of computer hardware will increment at different rates. Further, the operating system may affect the rate at which HPC 400 increments. Platform counter 410 may be implemented in some embodiments using a counter composed of hardware devices such as flip-flops.

In some embodiments, entropy values 15 ("EVs") may be collected by combining entries from one or more HPCs 400 and one or more timer models 300. In some embodiments, the entropy value collector 10 obtains values longer than the length of the EVs 15 in Entropy Pool 20. This situation may arise, for example, when entropy value collector 10 captures unsigned long values from platform counter 410. For example, unsigned long values in some embodiments may include unsigned long 64-bit values. An example of this situation is shown in FIG. 4C. In this situation, processor 5 will break the obtained long value 451 into an EV 15 of the correct length using XOR function 450, as shown in FIG. 4C. In that figure each "x" 452 represents an entropy location. Assuming the entropy is located in one bit range in the source, XOR function 450 preserves the entropy from the initial source regardless of the entropy's location. The location of the entropy can change depending on the platform used to implement entropy value collector 10. Thus, even if the PRNG cuts the bit range containing entropy into two words, XOR function 450 still preserves the whole entropy in output 453 by placing one part 453 containing entropy at the beginning of the EV 15 and the other part 454 at the end. XOR function 450 can also support words containing multiple entropy locations in the source by overlapping the entropy in XOR function 450. In this case, the resulting output from XOR function 450 will also contain entropy. However, the entire entropy likely exceeds one bit in this case.

Referring again to FIG. 1, the processor sends the data captured from entropy value collector 10 to entropy pool 20. Entropy pool 20 is a memory device that is used to store entropy values. Entropy pool 20 can be an internal memory to a PC or an external memory unit on which data can be written. In some embodiments, the type of memory unit chosen will depend on the level of security desired for PRNG function 100. For example, the level of security offered by current technology used to implement external memory units may render some external memory units unsuitable for some embodiments of PRNG function 100.

The size of entropy pool 20 may depend on many factors. In some embodiments, these factors may include the performance and security that a user desires. In general, security may be improved by increasing the size of entropy pool 20 and/or increasing the number of entropy bits per word in entropy pool 20. For example, in one embodiment of PRNG function 100 consistent with the present invention, a high level of security was achieved when the size of Random Pool 40 equaled 256 bits having 256-bits of entropy. Achieving 256-bit entropy in the Random Pool 40 can be accomplished by having Entropy Pool 20 consist of 128 words, or EVs 15, where each EV 15 contains at least 2 bits of entropy. In cases where each EV 15 has 4 bytes, the size of Entropy Pool 20 can equal 512 bytes. Further, the number of EVs 15 that entropy pool 20 can store will depend on the size of the memory and the size of the entropy values. In one embodiment, entropy pool 20 can store 256 words or 1024 bytes; however, an entropy pool of any size may be used.

When requiring strong protection of the PRNG, the initialization of PRNG function 100 should have enough entropy to resist a brute force attack. For example, using conventional methods, it is currently believed that 256-bit entropy makes brute force attacks unfeasible. Therefore, at least one exemplary embodiment collects 128 EVs 15 (assuming each contains 2-bit entropy) into Entropy Pool 20 to initialize Random Pool 40.

Initializing Entropy Pool 20 can take a long time when compared to the pace at which random numbers are requested by a calling function, program, user, etc. For instance, if 2 EVs are captured every 10 ms, filling Entropy Pool 20 to achieve the level of security in the embodiment described above would take 640 ms, assuming 2 bits of entropy per EV 15. Time or security restrictions may require the initialization procedure to occur faster or the amount of entropy in Entropy Pool 20 to be larger. Therefore, in some embodiments, a strength-parameter may be set by the user upon initialization to define the amount of entropy in Entropy Pool 20. For example, these definitions may be defined in variables as follows:

RNG_STRENGTH_MEDIUM=64
RNG_STRENGTH_STRONG=128
RNG_STRENGTH_MAX=256

Each value represents the number of bits containing entropy in Entropy Pool 20. A user can change these values to accommodate the level of security desired for a particular system. A user can also use different variables to define the strength parameter.

After collecting a sufficient number of EVs 15, the processor applies a hash algorithm 30 to the EVs 15 in Entropy Pool 20 to generate a non-reversible result. This non-reversible result is used as the internal state of PRNG function 100. The processor stores this result in Random Pool 40. Hash algorithm 30 may be any one-way, cryptographic hash function, such as, for example, the MD-5, SHA-1, SHA-256, SHA-512, and RIPEMD-160 hash algorithms. Random Pool 40 can be any writable memory device, such as internal memory to a PC or external memory such as a FLASH drive.

Figure 5:
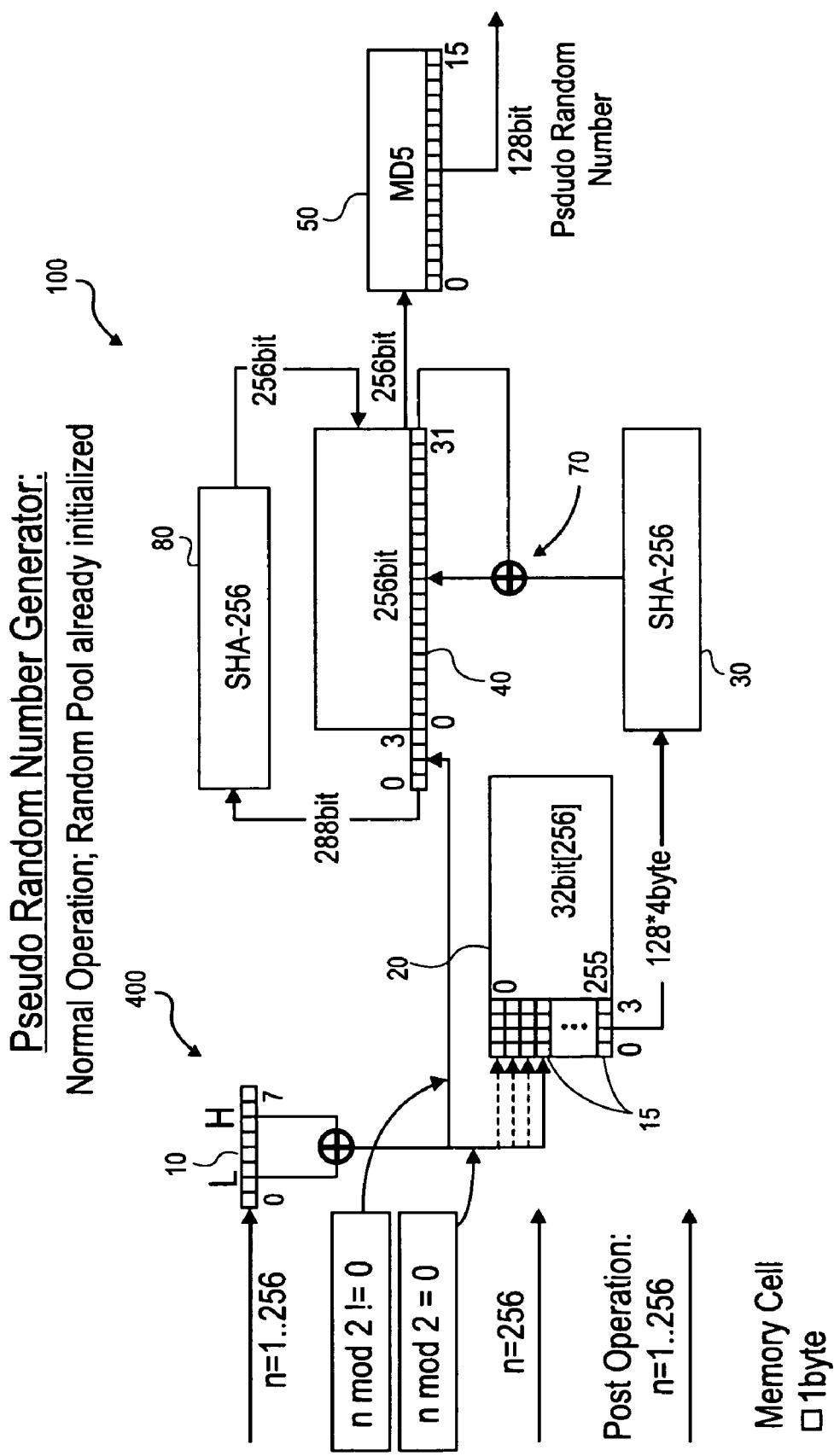
FIG. 5 shows one embodiment of a PRNG consistent with the present invention in operation after initializing the Random Pool.

After Random Pool 40 is initialized as shown in FIG. 5, PRNG function 100 may generate pseudo-random numbers in some embodiments by applying an output hash function 50, such as the MD5 hash function, to the value in Random Pool 40. Output hash function 50, used for generating the pseudo-random numbers from Random Pool 40, protects the internal state of the PRNG function because of its one-way property. In some embodiments, output hash function 50 is chosen so as to have no mathematical relationship to the first hash algorithm. Applying an output hash function to the value in Random Pool 40 allows PRNG function 100 to produce more secure pseudo-random numbers than if it relied solely on the values contained in Entropy Pool 20 to a PRN output.

Figure 6:
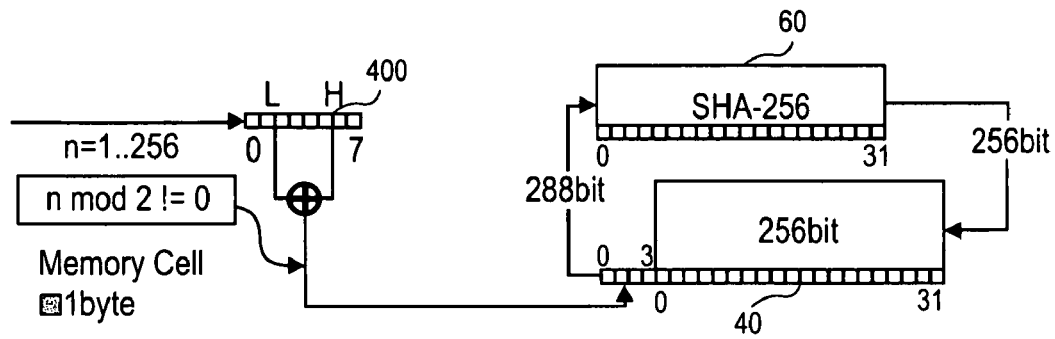
FIG. 6 shows one exemplary Spitting Random Pool Update function using input from the HPC to update the internal state within the Random Pool.

Further security can be provided using a Spitting Random Pool Update function, such as the one shown in FIG. 6, to transform the internal state of PRNG function 100 each time a pseudo-random number is generated. The processor controls when the Spitting Random Pool Update function is called and implements this function. In one embodiment, such as the one shown in FIG. 5, the Spitting Random Pool Update appends every second EV 15 in front of Random Pool 40 and applies an update hash function 60 to the combination to create the new internal state held within Random Pool 40. In some embodiments, such as the one shown in FIG. 6, the Spitting Random Pool Update function inputs one 32-bit word from HPC 400 and the value in Random Pool 40 into update hash function 60 to produce the updated value for Random Pool 40. In the embodiment shown in FIG. 6, the word from HPC 400 used in the Spitting Random Pool Update is altered every second transformation of Random Pool 40. As a result, should a third-party match an old internal state of PRNG function 100, at most only one further step is taken on the same loop before the Spitting Random Pool Update alters the determinism of the hash algorithm. This technique should efficiently prevent the third-party from using loop detection to compromise the security of PRNG function 100. In some embodiments, the word for the Spitting Random Pool Update is altered after one or more transformations of Random Pool 40.

Additional features of the Spitting Random Pool Update function are possible. For instance, in some embodiments, the Spitting Random Pool Update function can use EVs 15 obtained from timer model 300. Some embodiments may use an EV 15 in the Spitting Random Pool Update function any multiple of times that the function is called, such as every time, every third time, every fourth time, etc. Some embodiments might draw the EV 15 from Entropy Pool 20. Some embodiments may use an EV 15 drawn from multiple sources.

The hash algorithm used in the Spitting Random Pool Update for implementing update hash algorithm 60 must meet at least two requirements. First, it must preserve the statistical quality of, and the entropy contained in, Random Pool 40. Second, update hash algorithm 60 must provide a sufficiently large cycle to prevent a new state from equaling an older state of Random Pool 40. If a hash algorithm does not provide a large enough cycle, then a new state produced by the algorithm may equal an older state. In this case, all subsequent values of Random Pool 40 will equal successor values of the older state of the same value, trapping PRNG function 100 in a loop. Therefore, PRNG function 100 uses output hash algorithm 60 as a countermeasure to prevent PRNG function 100 from running into loops. In some embodiments, the SHA hash algorithm was used because it met these requirements. The Spitting Random Pool Update function also serves as a countermeasure preventing PRNG function 100 from entering a loop by incorporating new values, containing entropy, from at least one of HPC 400 and Entropy Pool 20 into the internal state of PRNG function 100 when updating Random Pool 40.

Figure 7:
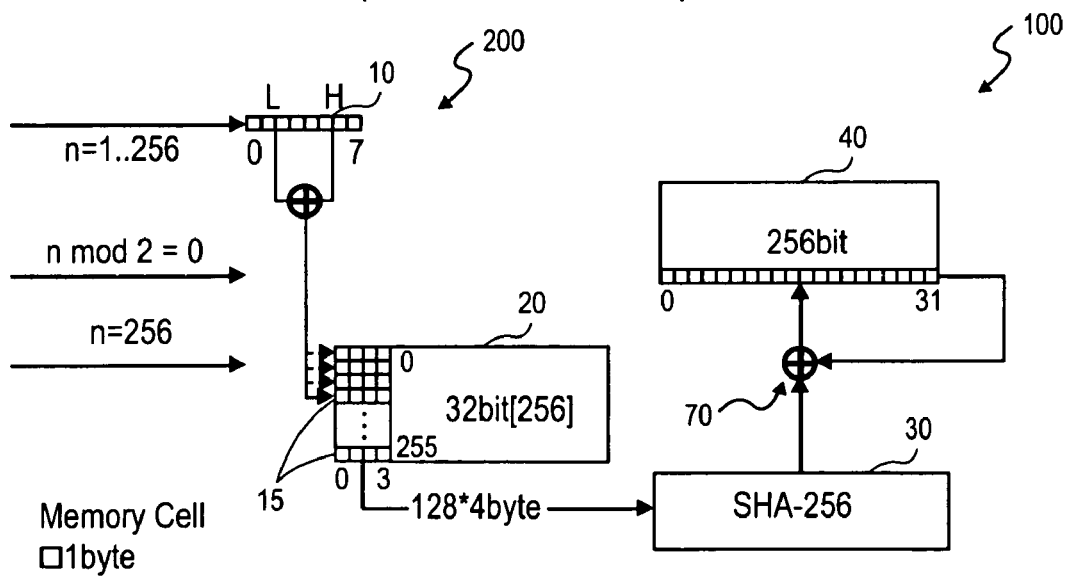
FIG. 7 shows one exemplary Random Pool update using data from the Entropy Pool collected from an HPC model consistent with the present invention.

If an attacker can predict a single Random Pool 40 state, a hacker may be able to use a forward brute-force attack to guess the used Entropy Value 15. Thus, to further protect the security of the system in some embodiments, a Complete Random Pool Update function may be used after a certain number of queries to Random Pool 40. This function refreshes the value of Random Pool 40 using EVs 15 from Entropy Pool 20. In one specific example, for instance, after every 256 queries of Random Pool 40 to create a pseudo-random number, PRNG function 100 refreshes Random Pool 40 by inputting 128 fresh EVs 15 from Entropy Pool 20 into hash function 30, again assuming 2-bit entropy per EV. The output from hash function 30 becomes the new state of Random Pool 40. In other embodiments, such as the one shown in FIG. 7, PRNG function 100 applies an XOR hash function 70 to the output of hash function 30 and the current state of Random Pool 40 to create the new state of Random Pool 40, increasing the security of PRNG function 100 in the process. In this case, PRNG function 100 uses the entropy of Entropy Pool 20 to protect against an attacker discovering the new value in Random Pool 40 even if the attacker knows the current value of Random Pool 40. Alternatively, even if an attacker can predict or observe the hash values of Entropy Pool 20, the attacker can predict neither the random numbers generated next nor the refreshed state of Random Pool 40 without knowledge of the old state of Random Pool 40.

This invention also provides a method for generating a pseudo-random number. This method includes steps for collecting data having entropy, applying a first hash function to this data to create an internal state, and applying an output hash function to create the pseudo-random output. Some embodiments also include a step for updating the internal state after generating each pseudo-random number. Some embodiments also include a step for refreshing the internal state of the PRNG.

Figure 8:
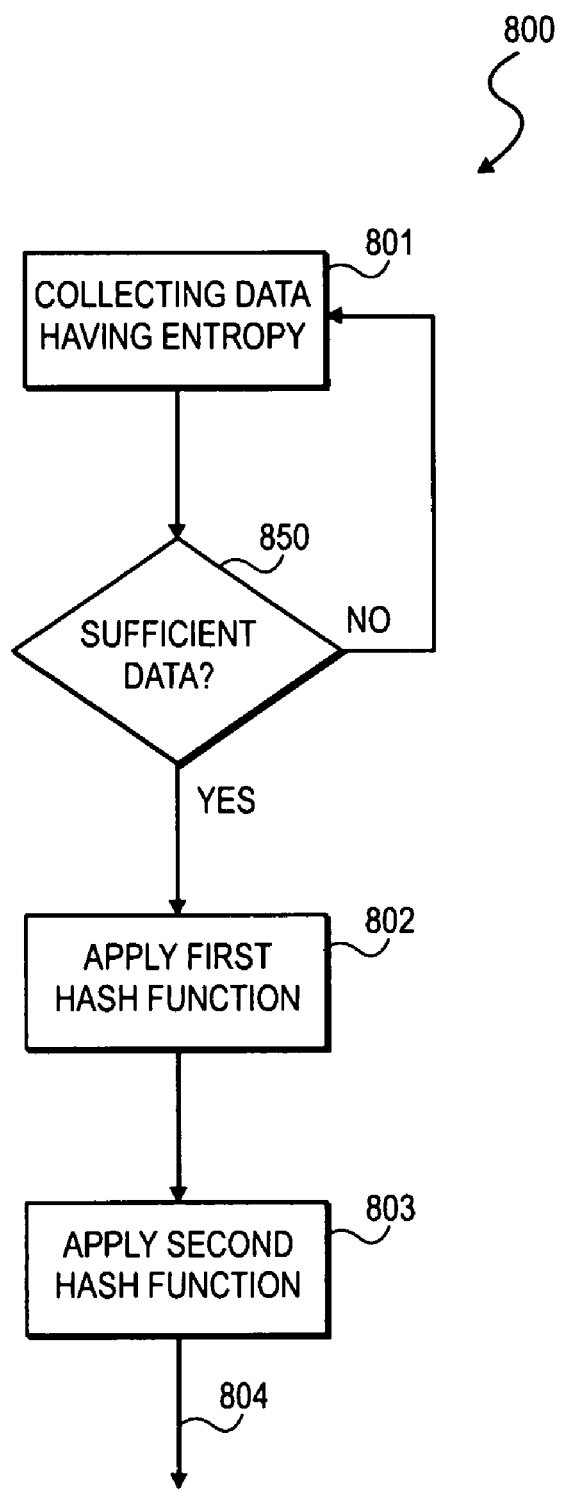
FIG. 8 shows one exemplary flow diagram of a process used to generate a random number consistent with the present invention.

Referring to FIG. 8, method 800 for generating a pseudo-random number begins by collecting data having entropy, as shown in step 801. Step 801 can collect the data in a variety of ways. For instance, step 801 can collect entropy-containing data by polling different clocks where at least one clock increments at a higher rate than one other clock. Collecting data containing entropy can also be accomplished by polling other random events such as human interactions with a device.

The step of collecting data containing entropy 801 continues until a sufficient amount of data has been collected, as shown for example in step 850. The sufficiency of the data can depend on a variety of factors, including the strength desired in the pseudo-random output, the amount of entropy contained in each piece of collected data, the time needed to collect each additional piece of data containing entropy, the time the PRNG has to initialize its operation, etc. In some embodiments, user-defined inputs control the amount of data considered sufficient in step 850. These inputs, for example, can be based on the level of strength desired by the user. A processor or CPU can be used to initiate the process of collecting data containing entropy.

In some embodiments, once the PRNG collects a sufficient amount of data, method 800 applies a first hash function to the collected data, as shown for example in step 802. Step 802 applies a one-way, cryptographic hash function to produce a non-reversible result. Method 800 uses the output from step 802 as the state information.

In some embodiments, method 800 then applies a second cryptographic hash function to the state information, as shown in step 803. In some embodiments, step 803 uses a second hash function having no correlation to the first cryptographic hash function used in step 802. Also, some embodiments of the PRNG use a hash function in step 803 that has a one-way property to protect the state information from discovery by third parties. The PRNG outputs the result 804 from step 803 in which a second hash function is applied as the output of the method 800.

Figure 9:
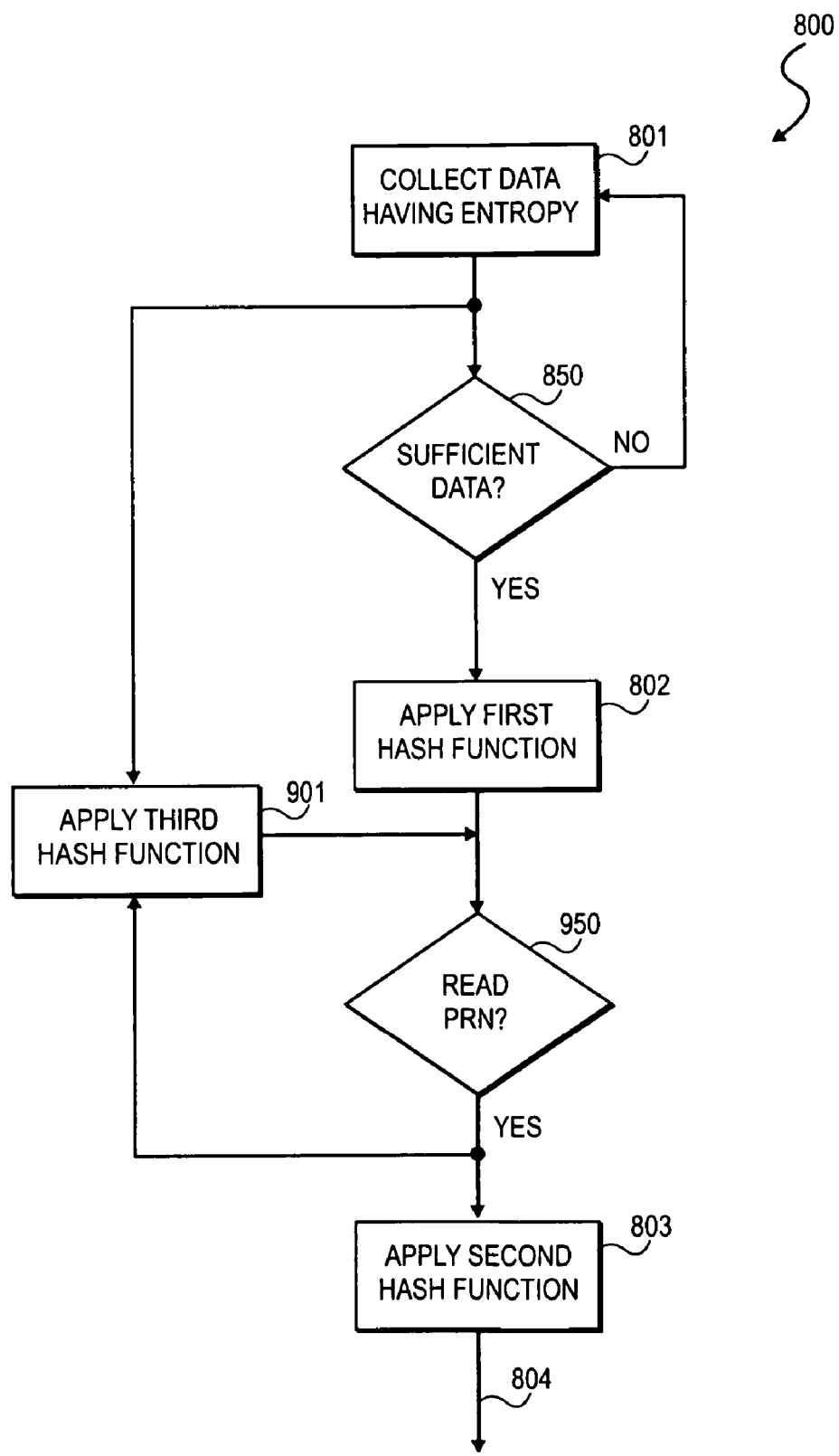
FIG. 9 shows one exemplary flow diagram of a process used to generate a random number consistent with the present invention.

Some embodiments of the PRNG include method 900 having additional steps, as shown in FIG. 9. Some embodiments include step 901 in which a third cryptographic hash function is applied to update the state information when creating a new pseudo-random number. Step 901 can apply a third hash function to a combination of the output from step 950 and data from output of step 801 in which data having entropy is collected. By using output from step 801, step 901 increases the security of the pseudo-random number created by method 900 by introducing additional entropy when creating additional PRN.

Other embodiments of the invention will be apparent to those skilled in the art from consideration of the specification and practice of the invention disclosed herein. For example, the methods described above may be embodied in a computer-readable medium as a set of instructions for causing a computer to perform the desired method. It is intended that the specification and examples be considered as exemplary only, with a true scope and spirit of the invention being indicated by the following claims.

What is claimed is:

1. A system for generating a pseudo-random number, the system comprising:
   an entropy value collector for collecting entropy values, wherein the entropy value collector breaks obtained values into entropy values of a desired entropy value length when the obtained values are longer than the desired entropy value length;
   a first data memory for storing at least one set of entropy values collected by the entropy value collector;
   a second data memory for storing an internal state; and
   a processor for:
   transforming a first set of entropy values stored in the first data memory to form the internal state;
   generating a pseudo-random number by transforming the internal state;
   updating the internal state using the current value of the internal state and entropy values from the entropy value collector; and
   refreshing the internal state by transforming a second set of entropy values stored in the first data memory and combining the result of the transformation of the second set of entropy values with the current value of the internal state, wherein the entropy value collector collects entropy values using at least one of a high performance counter model and a system timer.

2. The pseudo-random number generator of claim 1, wherein the processor performs the step of transforming the first set of entropy values using a cryptographic hash function.

3. The pseudo-random number generator of claim 1, wherein a number of entropy values are contained in the first set of entropy values, wherein the number of entropy values is a function of the amount of entropy contained in the entropy values.

4. The pseudo-random number generator of claim 1, wherein the entropy value collector further:
   creates entropy values, at least partly, by applying a logical operation.

5. The pseudo-random number generator of claim 4, wherein the output of the logical operation contains the same amount of entropy as the input to the logical operation.

6. The pseudo-random number generator of claim 1, wherein the processor refreshes the internal state on a periodic basis.

7. The pseudo-random number generator of claim 6, wherein the processor further receives information from a user for determining when refreshing the internal state is accomplished.

8. A computer-implemented method for generating a pseudo-random number, the method comprising:
   collecting data having entropy in a memory, wherein an entropy value collector breaks the collected data into entropy values of a desired entropy value length when the collected data is longer than the desired entropy value length;
   using a processor to transform a first set of entropy values using a first cryptographic hash function to form an internal state;
   using the internal state to generate a pseudo-random number by applying a second cryptographic hash function such that no correlation exists between the first cryptographic hash function and the second cryptographic hash function;

updating the internal state by applying a third cryptographic hash function to newly collected entropy values and the internal state, wherein updating the internal state by applying a third cryptographic hash function to newly collected entropy values and the internal state includes appending an entropy value of the desired length to the internal state; and refreshing the internal state by transforming a second set of entropy values using the first cryptographic hash function and combining the result of the transformation of the second set of entropy values with the internal state.

9. The method of claim 8, wherein the amount of collected data varies as a function of the entropy of the data.

10. A non-transitory computer-readable medium containing instructions for causing a computer to perform a method for generating a pseudo-random number, and the method comprising:

receiving data having entropy, wherein an entropy value collector breaks the received data into entropy values of a desired entropy value length when the received data is longer than a desired entropy value length;

transforming at least some of the entropy values to form an internal state;

using the internal state to generate a pseudo-random number;

updating the internal state using data from at least one of entropy values having entropy and the internal state; and refreshing the internal state by transforming a new set of entropy values and combining the result of the transformation of the new set of entropy values with the internal state, wherein the entropy value collector collects entropy values using at least one of a high performance counter model and a system timer.

11. The computer readable medium of claim 10, wherein the step of transforming the received data is accomplished using a cryptographic hash function.

12. The computer readable medium of claim 10, wherein the amount of received data transformed to form the internal state is a function of the amount of entropy contained in the received data.

13. The computer readable medium of claim 10, further comprising applying a logical function to at least some of the received data.

14. The computer readable medium of claim 10, wherein the internal state is refreshed on a periodic basis.

15. The computer readable medium of claim 14, further comprising receiving information from a user for determining when refreshing the internal state occurs.

16. The pseudo-random number generator of claim 1, where updating the internal state using the current value of the internal state and entropy values from the entropy value collector includes appending an entropy value of the desired length to the current value of internal state.

17. The computer readable medium of claim 10, wherein the step of updating the internal state using data from at least one of entropy values having entropy and the internal state includes appending an entropy value of the desired length to the internal state.

* * * * *